United States Patent
Tacey

[15] 3,636,230
[45] Jan. 18, 1972

[54] DIDACTIC APPARATUS

[72] Inventor: Charles Arthur Tacey, London, England

[73] Assignee: Philograph Publications Limited, London, England

[22] Filed: July 8, 1970

[21] Appl. No.: 53,100

[30] Foreign Application Priority Data

July 10, 1969 Great Britain .................... 34,815/69

[52] U.S. Cl. .................................. 35/34, 35/72, 46/26, 46/31
[51] Int. Cl. ............................. G09b 19/02, A63h 33/12
[58] Field of Search .............. 35/31 R, 31 G, 31 D, 70, 72, 35/34, 30, 32; 46/26, 31

[56] References Cited

UNITED STATES PATENTS 3,274,727 9/1966 Zander ..................... 46/31 X

FOREIGN PATENTS OR APPLICATIONS 1,392,930 2/1965 France ........................ 35/70
744,850 2/1956 Great Britain ............. 35/70
890,608 3/1962 Great Britain ............. 46/26

*Primary Examiner*—Wm. H. Grieb
*Attorney*—Linton & Linton

[57] ABSTRACT

This invention is concerned with didactic structural apparatus and comprises a plurality of uniformly shaped and dimensioned cuboidal units and connecting means therefore whereby said units can be assembled to provide stable examples of areas and three-dimensional solids which can be used in the teaching of arithmetic and geometry.

4 Claims, 2 Drawing Figures

INVENTOR:
CHARLES ARTHUR TACEY

DIDACTIC APPARATUS

This invention relates primarily to didactic constructional apparatus more particularly for teaching the basic principles of arithmetic and solid and plane geometry, and has for its principal object to provide means whereby teachers and students will be enabled to assemble units, e.g., cubes and cuboid forms, so as to demonstrate, for example, 'breadth × width × height' formulas in relation to assemblies of concrete units of uniform size.

Constructional apparatus according to the invention, and in one embodiment, comprises a plurality of uniformly shaped and dimensioned units each having on one face a spigot projection and in an opposite parallel face a corresponding recess or socket whereby said units may be frictionally connected one to the other to form rods incorporating any required number of units; a reticular sheet or sheets of relatively stiff material each formed with uniformly arranged interstices spaced apart in accordance with the dimensions of said units and corresponding in size and adapted to receive the spigots thereof; and a plurality of friction fit caps for fitting to the spigots of individual units. The thickness of said apertured sheets and said caps is less than the depth of a spigot. Said apertured sheets are hereinafter usually referred to as 'reticules.'

Said units may be composed of any suitable material, for example one of the so-called plastics compositions, a hard rubber or rubberlike composition, wood, or the like. Said reticules and caps may be formed of a plastics material, metal, stout paper, or any other suitable material.

In use, a required number of said units are laid in a juxtaposed row or rows on a flat surface, with their spigots uppermost, so as to form a rectangle of desired size. This array of units may represent, for example, a particular area, L units in length by B units in breadth, or the base of a cube or a cuboid form.

A reticule of appropriate size, or a series of smaller overlapped reticules, is or are placed over said units so that the spigots of the latter project through the interstices of the reticule whereby the units are held together as in a matrix.

By means of their sockets or recesses, a second layer or course of units, and so on may be superposed on and be joined to the first formed layer or course of units thereby to form a cuboidal shape having a length L, breadth B and a height H corresponding respectively to the number (L) of units in each row, the number (B) of rows of units, and the number (H) of layers of units superposed one upon the other. Reticules may be interposed wherever necessary to achieve stability of the formed shape, and an upper or terminal reticule can be held in place by friction caps fitted to the spigots of the uppermost (or a single) layer or course of units.

Thus, the units are readily connectable one with the other vertically by means of their spigots and sockets, and are connectable in side-by-side contiguous relationship by the reticules. The resultant forms or shapes may as readily be dismantled and the units repeatedly reused.

The invention is further described with the aid of the accompanying drawings which illustrate by way of example only, one embodiment.

Figure 1:
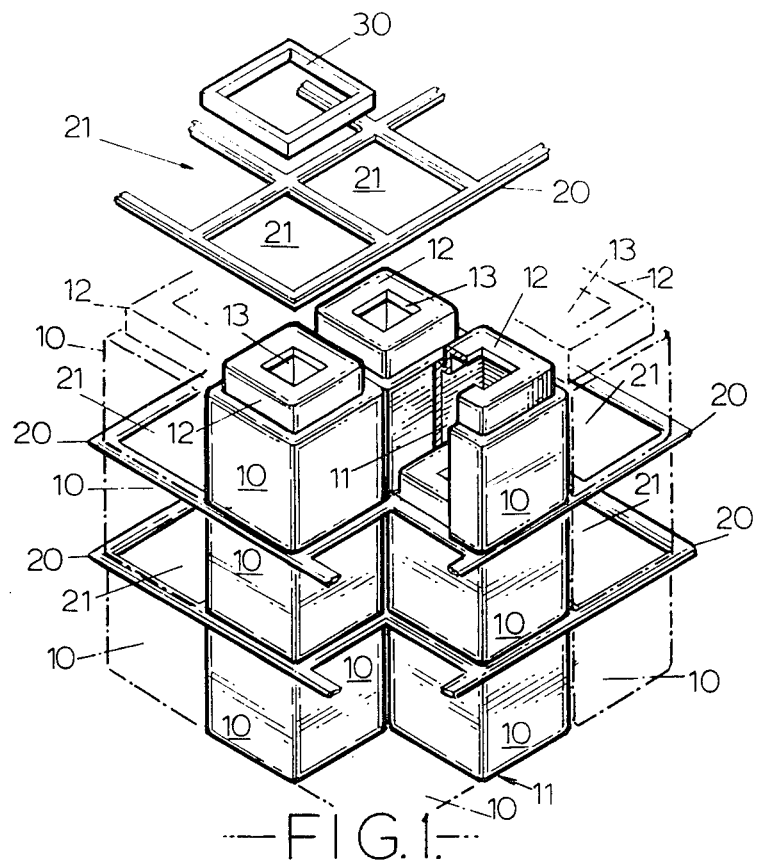
FIG. 1 is a perspective view of an assembly of units according to the invention with some of said units shown in phantom and with parts broken away thereby to show their construction and the method of connection.
Figure 2:
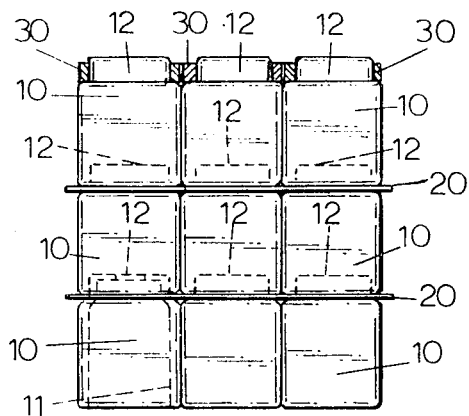
FIG. 2 is a side elevation of an assembly of connected units.

Referring to said drawings, each unit 10 is in the shape of a cube consisting in this instance of a hollow plastics moulding about three-quarters of an inch square and one face whereof is open thereby to constitute a recess or socket 11. The opposite face is formed with a medial rectangular spigot projection 12 of dimensions such as to be a friction fit as shown in the socket 11 of a fellow unit 10. Said spigots 12 are about three sixteenths of an inch in depth and preferably formed with a central aperture 13.

Reticules 20 for connecting said units 10, as shown, may also be moulded from a plastics material, or blanked out from a sheet of plastics material, and are generally rectangular in shape being formed with rows of rectangular interstices 21 dimensioned and arranged as shown so as to receive the spigots 12 of an array of units 10 when arranged in contiguous rows. Said reticules 20 are of a thickness such as to provide for the frictional interlocking of superposed layers or courses of units 10 one with the other. Said reticules 20 may be of any desired size adapted to receive any number of said units 10. In a basic form which has been found convenient, said reticules 20 comprise ten rows of ten interstices 21. Small reticules can readily be cut from such a sheet.

Friction fit caps 30 are provided for engagement with the spigots 12 of individual units 10 said caps 30 each comprising an open rectangular (square) frame the sides whereof are of a depth less than the depth of the spigots 12. Said caps 30 may be used to hold the units 10 of a two-dimensional array in place within the interstices of a reticule 20, or to square off the top of a three dimensional assembly.

It will be seen that constructional apparatus according to the invention, and comprising an assemblage of interlocking units 10, complementary reticules 20 and friction caps 30 provides a means whereby teachers and students are enabled to form practical concrete examples of areas and three-dimensional solids, thereby to form analogues demonstrating the concepts and elements essential to the introduction, examination, and operation of the principles employed with multi-based arithmetic.

It is envisaged that constructional apparatus according to the invention may be used for heuristic purposes in the building of structures generally.

I claim:

1. Didactic constructional apparatus, comprising a plurality of uniformly shaped and dimensioned units, each unit having on one face a spigot projection and in an opposite parallel face a corresponding socket whereby said units may be frictionally connected one to the other to form rods incorporating any required number of units; one or more reticular sheets formed with uniformly spaced interstices spaced apart in accordance with the dimensions of said units and corresponding in size and adapted to receive the spigots of said units whereby said units may be connected in side-by-side relationship; and a plurality of friction fit caps for fitting to the spigots of individual units: and the thickness of the or each reticular sheet and of each cap being less than the depth of a spigot.

2. Constructional apparatus, as claimed in claim 1, wherein said units each are of hollow cuboidal shape one face whereof is open to form a square socket and the opposite face comprises a square spigot projection having a central aperture.

3. Constructional apparatus, as claimed in claim 2, wherein said reticular sheets are generally rectangular in shape being formed with rows of rectangular interstices dimensioned and arranged so as to receive the spigot projections of an array of units when arranged in a contiguous row or rows.

4. Constructional apparatus, as claimed in claim 2 wherein said friction fit caps are in the form of square open frames dimensioned so as to be friction fit upon the spigot projections of said units.

* * * * *